(12) United States Patent
Venkatesan et al.

(10) Patent No.: US 11,411,231 B2
(45) Date of Patent: Aug. 9, 2022

(54) AUXILIARY ELECTRODE MEDIATED MEMBRANE-FREE REDOX ELECTROCHEMICAL CELL FOR ENERGY STORAGE

(71) Applicant: UTI LIMITED PARTNERSHIP, Calgary (CA)

(72) Inventors: Senthil Velan Venkatesan, Calgary (CA); Kunal Karan, Calgary (CA); Stephen Larter, Calgary (CA); Venkataraman Thangadurai, Calgary (CA); Jagos R Radovic, Calgary (CA)

(73) Assignee: UTI LIMITED PARTNERSHIP, Calgary (CA)

( * ) Notice: Subject to any disclaimer, the term of this patent is extended or adjusted under 35 U.S.C. 154(b) by 0 days.

(21) Appl. No.: 16/992,083

(22) Filed: Aug. 12, 2020

(65) Prior Publication Data

US 2021/0098804 A1     Apr. 1, 2021

Related U.S. Application Data

(60) Provisional application No. 62/887,464, filed on Aug. 15, 2019.

(51) Int. Cl.
| | | |
|---|---|---|
| *H01M 8/04186* | (2016.01) | |
| *H01M 4/90* | (2006.01) | |
| *H01M 4/86* | (2006.01) | |
| *H01M 8/18* | (2006.01) | |

(52) U.S. Cl.
CPC ..... *H01M 8/04194* (2013.01); *H01M 4/8626* (2013.01); *H01M 4/9016* (2013.01); *H01M 8/188* (2013.01)

(58) Field of Classification Search
CPC .... H01M 8/18; H01M 8/04194; H01M 8/188; H01M 4/8626; H01M 4/9016
See application file for complete search history.

(56) References Cited

PUBLICATIONS

Bae, C.; Chakrabarti, H.; Roberts, E. A Membrane Free Electrochemical Cell Using Porous Flow-Through Graphite Felt Electrodes. J. Appl. Electrochem. 2008, 38, 637-644.

Bennett, B., and S. R. Larter, The isolation, occurrence and origin of fluorenones in crude oils and rock extracts, Org. Geochem. 2000, 31(1), 117-125.

Braff, W. A.; Bazant, M. Z.; Buie, C. R. Membrane-less Hydrogen Bromine Flow Battery. Nat. Commun. 2013, 4, 1-6.

Brooker, R. P.; Bell, C. J.; Bonville, L. J.; Kunz, H. R.; Fenton, J. M. Determining Vanadium Concentrations Using the UV-Vis Response Method. J Electrochem. Soc. 2015, 162, A608-A613.

(Continued)

*Primary Examiner* — James Lee
(74) *Attorney, Agent, or Firm* — FisherBroyles LLP; Anthony Dovale

(57) ABSTRACT

The invention provides a membrane-free redox cell utilizing auxiliary electrodes that facilitate fast charging and discharging of anolyte and catholyte for electrochemical energy storage. The anode and cathode chambers are ionically separated, and electrically connected through a conductor joining auxiliary electrodes comprised of a redox material. In use, charging/discharging of the galvanic cell takes place between primary electrodes, and the redox material is immersed in the electrolyte in both anode and cathode chambers.

19 Claims, 9 Drawing Sheets

(56) References Cited

PUBLICATIONS

Karan, K. Interesting Facets of Surface, Interfacial, and Bulk Characteristics of Perfluorinated Ionomer Films. Langmuir 2019, DOI: 10.1021/acs.langmuir.8b03721.

Kjeang, E.; Michel, R.; Harrington, D. A.; Djilali, N.; Sinton, D. A Microfluidic Fuel Cell with Flow-Through Porous Electrodes. J Am. Chem. Soc. 2008, 130, 4000-4006.

Larcher, D.; Tarascon, J. M. Towards Greener and More Sustainable Batteries for Electrical Energy Storage. Nat. Chem. 2015, 7, 19-29.

Leung, P. K. et al. Membrane-Less Hybrid Flow Battery Based on Low-Cost Elements. J. Power Sources 2017, 341, 36-45.

Leung, P. K.; Martin, T.; Shah, A. A.; Anderson, M. A.; Palma, J. Membrane-less Organic-Inorganic Aqueous Flow Batteries with Improved Cell Potential. Chern. Commun. 2016, 52, 14270-14273.

Li, X.; Zhang, H.; Mai, Z.; Zhang, H.; Vankelecom, I. Ion Exchange Membranes for Vanadium Redox Flow Battery (VRB) Applications. Energy Environ Sci. 2011, 4, 1147.

Moschopedis, S. E., and J. G. Speight, Oxygen functions in asphaltenes, Fuel 1976, 55(4), 334-336.

Moschopedis, S. E., J. F. Fryer, and J. G. Speight, Investigation of the carbonyl functions in a resin fraction from Athabasca bitumen, Fuel 1976, 55(3), 184-186.

Navalpotro, P.; Palma, J.; Anderson, M.; Marcilla, R. A Membrane-Free Redox Flow Battery with Two Immiscible Redox Electrolytes Angew. Chemie—Int. Ed. 2017, 56, 12460-12465.

Park, M.; Ryu, J.; Wang, W.; Cho, J. Material Design and Engineering of Next-Generation Flow-Battery Technologies. Nat. Rev. Mater. 2016, 2, 16080, 1-18.

Radović, J. R., T. B. P. Oldenburg, and S. R. Larter, Chapter 19—Environmental Assessment of Spills Related to Oil Exploitation in Canada's Oil Sands Region, in Oil Spill Environmental Forensics Case Studies, Ed. by S. A. Stout and Z. Wang, 2018, pp. 401-417, Butterworth-Heinemann.

Senthil Velan, V.; Velayutham, G.; Rajalakshmi, N.; Dhathathreyan, K. S. Influence of Compressive Stress on the Pore Structure of Carbon Cloth Based Gas Diffusion Layer Investigated by Capillary Flow Porometry. Int. J. Hydrogen Energy 2014, 39, 1752-59.

Service R.F., Solar plus batteries is now cheaper than fossil power, Science 2019, 365, 108.

Soloveichik, G. L. Flow Batteries: Current Status and Trends. Chem. Rev. 2015, 115, 11533-11558.

UNFCCC. Conference of the Parties (COP). Adoption of the Paris Agreement—Conference of the Parties COP 21. Adopt. Paris Agreement. Propos. by Pres. 2015, 21932, 32.( https://unfccc.int/process-and-meetings/the-paris-agreement/d2hhdC1pcy, (accessed on Jun. 18, 2019.)).

Venkatesan, S. V.; El Hannach, M.; Holdcroft, S.; Kjeang, E. Probing Nanoscale Membrane Degradation in Fuel Cells Through Electron Tomography. J. Memb. Sci. 2017, 539, 138-143.

Zhou, C.; Bag, S.; Thangadurai, V. Engineering Materials for Progressive All-Solid-State Na Batteries. ACS Energy Lett. 2018, 3, 2181-2198.

AUXILIARY ELECTRODE MEDIATED MEMBRANE-FREE REDOX ELECTROCHEMICAL CELL FOR ENERGY STORAGE

FIELD

The disclosed innovations are in the field of electrochemistry, relating to galvanic cells that have an electron conducting connection between auxiliary electrodes in place of an ion-conducting or other membrane.

BACKGROUND

Modern energy conversion systems are undergoing phenomenal transformation to solve the global challenges of addressing climate change while meeting steadily increasing energy demand [1,2]. Efficient electrochemical energy conversion systems such as fuel cells and redox flow batteries operating with zero or low greenhouse gas emissions can help mitigate global warming [3,4]. The expensive ionomer material, conventionally used as membranes in these devices, including proton exchange membrane fuel cells (PEMFCs) (~40% of the total cost of power device) [5], degrades over time and is identified as one of the hindrances to market penetration of these energy technologies [6,7]. Membrane-less electrochemical energy storage has also been proposed using microfluidic channels [8,9], millimeter-sized channels between anode and cathode [5,10], gaseous and liquid redox electrolytes [11], and immiscible anolytes and catholytes [12]. All of these advanced electrochemical cells necessitate anode and cathode compartments separated by ion-conducting membranes or laminar flow of electrolytic fluids for charge separation. Apparently, performance and durability issues associated with the ion-conducting membranes remain longstanding issues in fuel cells and batteries.

SUMMARY

An auxiliary electrode mediated membrane-free redox electrochemical cell (AEM$^2$RC) is disclosed herein. The present invention allows the use of aqueous (acidic/alkaline) or nonaqueous (acidic/alkaline) electrolytes in anode and cathode chambers independent of one another, with electron conducting material connecting the auxiliary electrodes in both chambers during charging and discharging reactions.

A first cell and electrolyte is in the first compartment, a second cell and either a different or the same electrolyte as that of first compartment, is in a second compartment. The two separate compartments are connected only through an electronically conducting material between auxiliary electrodes to form a galvanic cell. The auxiliary electrode must be a redox active material in a solid or a gel form.

A layer of ion conducting ionomer is coated on auxiliary electrodes to improve the performance of the cell.

Redox electrolyte material is in the liquid state or is a redox active solid particle dispersed in supporting electrolyte solution. During charging, anolyte is oxidized and catholyte is reduced. Corresponding auxiliary electrodes undergo reduction and oxidation respectively.

Since, electrons alone are transferred between the two compartments, a combination of aqueous, non aqueous, alkaline and acidic electrolytes is possible in the second compartment, independent of the nature of redox electrolyte in the first compartment.

Since the cathode and anode compartments are physically separate and connected only by an electron conducting material or metal wire, the cell can operate in a variety of applications. Where anode and cathode are in close proximity, the cell is practical for battery and energy storage applications. In settings where anode and cathode are widely separated, applications might include sensor systems (where one electrode compartment is a reference system and the other electrode compartment is a sensing element or probe). A calibrated reference compartment with known redox potential measures the redox potential of an unknown redox electrolyte.

The device may be useful in extracting energy from oxidation of organic matter in wastewater or fossil fuels, where an oxidant/air cathode is combined with a subsurface anode cell.

BRIEF DESCRIPTION OF THE DRAWINGS

FIG. 16 representing the schematic of stack description of AEM$^2$RC for 10-12 kW power generation.

FIG. 17 shows the hybrid AEM$^2$RC with 10 mM mixed model quinones (1:1:1 of acenaphthenequinone, phenanthrenequinone and 1,2-dihydroxyquinone) in 100 mM tetrabutylammomium hydroxide in NN'-dimethylformamide in anode and aqueous 100 mM iodine/100 mM KOH in cathode. Here, the auxiliary electrode pair used was $Ni^{3+}/Ni^{2+}$.

FIG. 18 shows cyclic voltammogram of 10 mM mixed model quinones (1:1:1 of acenaphthenequinone, phenanthrenequinone and 1,2-dihydroxyquinone) in N,N'' dimethylformamide with 100 mM tetrabutylammomium hydroxide in anode quinone and (c) 1,2-dihydroxyquinone in N,N'' dimethylformamide with 100 mM tetrabutylammomium hydroxide (red) cathode Iodine (blue).

FIG. 19 shows the cell capacity of $AEM^2RC$ during charge-discharge cycle for given electrode area of 2.25 $cm^2$.

FIG. 20 demonstrates an improved coulombic efficiency from charge-discharge characteristics for 100 cycles of (top) all-aqueous vanadium redox cell and (bottom) non-aqueous anode and aqueous cathode.

FIG. 21 shows (a) Polycyclic aromatic hydrocarbon (PAH) based quinones used in this study, (b) The proposed change in the structure of quinone-like molecule with charging reaction that may lead to the sharpening of NMR signal (c) $^1H$ NMR spectra of mixed quinones from anode after charging and discharging. NMR scans were recorded using at 400 MHz frequency with 50% sample: 50% $CDCl_3$.

DETAILED DESCRIPTION

Figure 1:
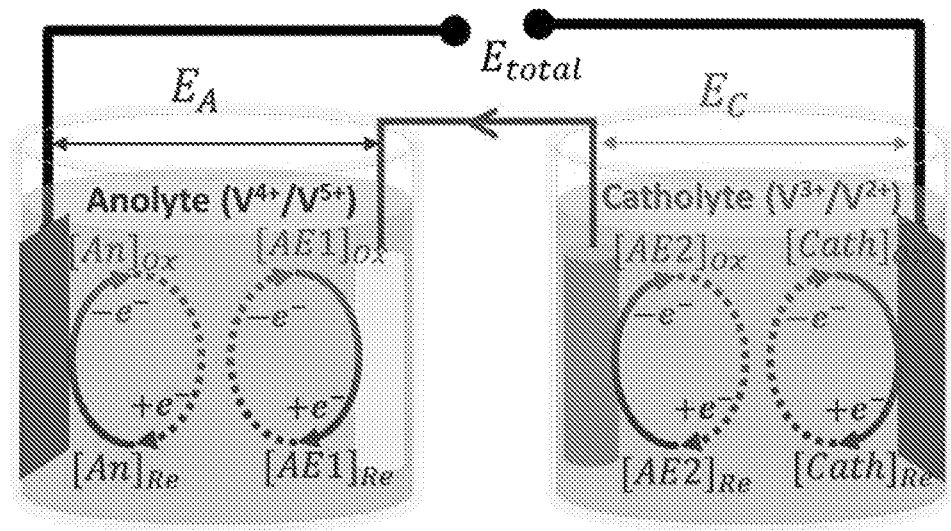
FIG. 1 illustrates a schematic depiction of an auxiliary electrode mediated membrane-free redox electrochemical cell (AEM$^2$RC)
Figure 2:
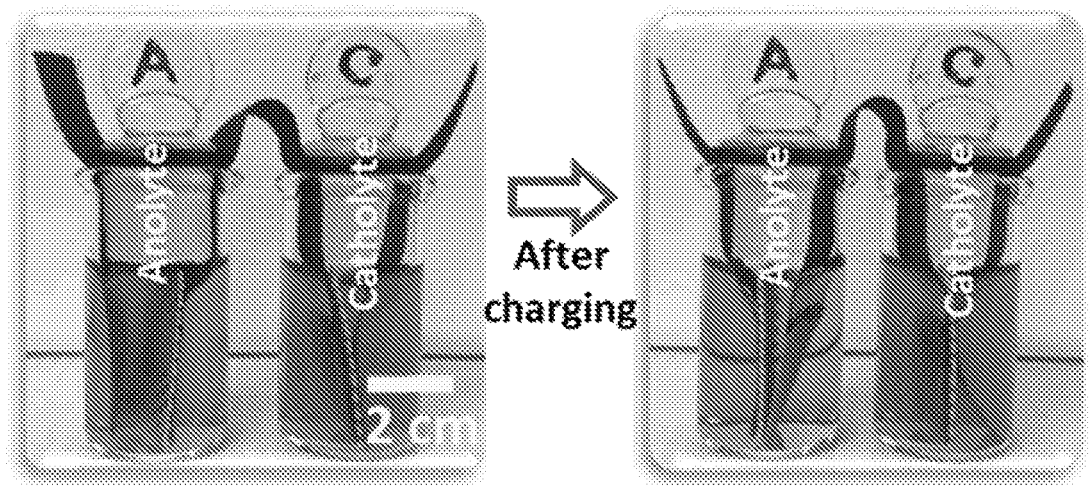
FIG. 2 shows the constructed prototype cell with auxiliary electrodes (AE), before charging (left panel) and after charging (right panel).

A separate chamber electrochemical redox cell is disclosed herein, adapted to store and release electrochemical energy, where the anode and cathode chambers are connected by auxiliary electrodes (AEs) through metal wire/electron conducting medium (FIG. 1). The constructed prototype is shown in FIG. 2. The proposed half-cell electrochemical redox reactions at anode, cathode and AEs are presented in eqns. (1-2).

Anode chamber reaction: $An_{Red} + AE1_{ox} \xrightarrow{Charge} An_{ox} + AE1_{Red}$ (1)

Cathode chamber reaction: $Ca_{ox} + AE2_{Red} \xrightarrow{Charge} Ca_{Red} + AE2_{ox}$ (2)

The overall potential of $AEM^2RC$ is:

$E_{Overall} = E_A + E_C = (E_a^0 - E_{AE1}^0) + (E_c^0 - E_{AE2}^0)$ (3)

where $E_A$ and $E_C$ represent half-cell potentials of anode and cathode side reactions [13]. $E_A$ is the potential difference between anode ($E_a^0$) and AE1 in the anode chamber, and $E_C$ is the potential difference between cathode ($E_c^0$) and AE2 in the cathode chamber (equation (3)). $E^o$ is the standard reduction potential of the redox couple under standard temperature (T=298.15 K) and pressure condition. The redox state switching accepts and releases electrons at the AEs.

Figure 3:
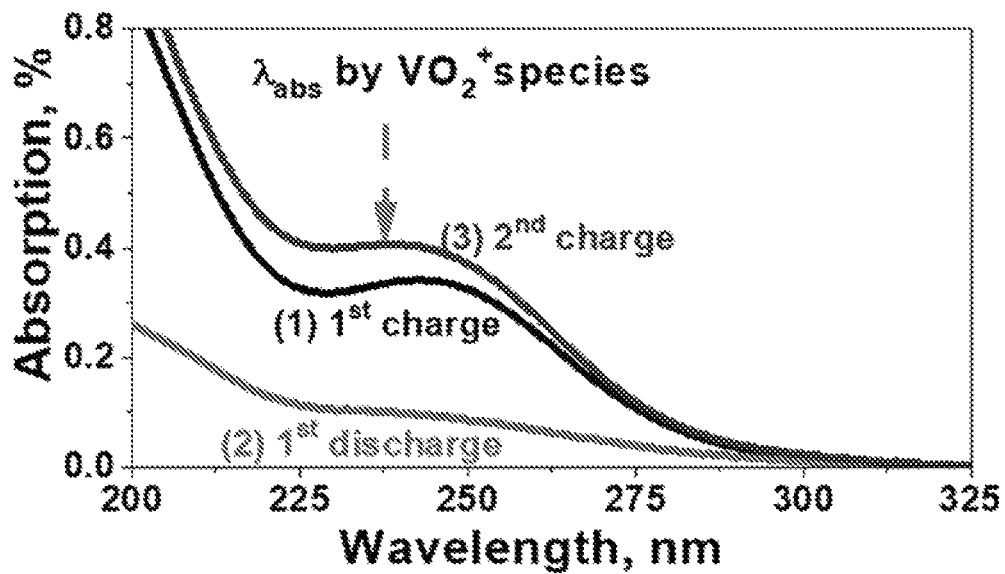
FIG. 3 shows the optical absorption of the anolyte taken at charged and discharged states as indicated.
Figure 4:
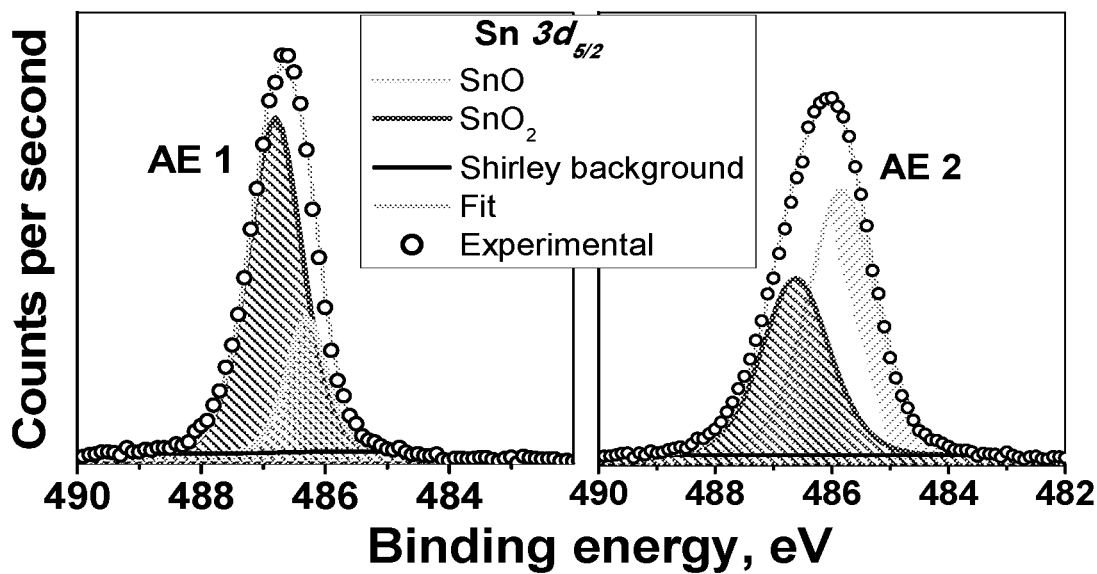
FIG. 4 shows XPS spectra of AE1 (left panel) and AE2 (right panel) electrodes, showing the change in oxidation state of elemental Sn $3d_{5/2}$ after charging the AEM$^2$RC.
Figure 5:
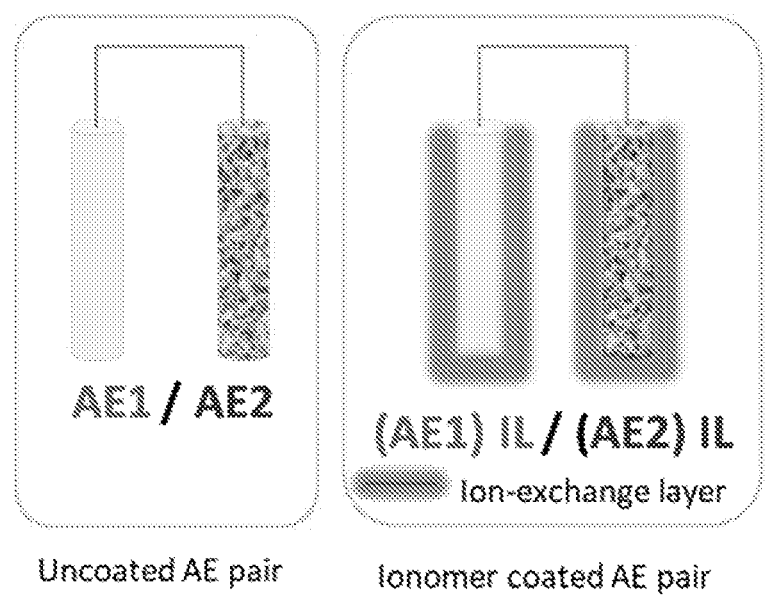
FIG. 5 consists of two panel showing the configuration of uncoated AE (left panel) and ionomer layer (IL) coated AE pairs (right panel).

As just one example of a practical configuration, starting with 100 mM vanadyl sulfate solution in both chambers, where vanadium exists in 3+ and 4+ oxidation states in equal amounts, during charging $VO^{2+}$ ($V^{4+}$) is oxidized to $VO_2^+$ ($V^{5+}$) at the anode and $V^{3+}$ ions are reduced to $V^{2+}$ at the cathode. The vanadium electrolyte in the anode compartment was taken in diluted small quantity at the end of charge, discharge, and charge cycles for analysis. The presence of $VO_2^+$ is supported by the optical absorption spectra of the anolyte in FIG. 3. The corresponding AEs undergo reduction ($Sn^{4+}$ to $Sn^{2+}$ at AE1) and oxidation ($Sn^{2+}$ to $Sn^{4+}$ at AE2) reactions. This is confirmed by the XPS spectra of the electrodes AE1 and AE2 in FIG. 4. The proposed redox electrochemical cell, without a membrane between the anode and cathode requires suitable AEs. (i.e., reduced form in the catholyte chamber and the oxidized form in the anolyte chamber.) A stoichiometrically higher amount of AE loading compared to the mass of the redox active electrolyte is preferred to overcome concentration dependent limitations (FIG. 5). The two half-cells when connected form a complete cell (Eqn. 3) with a total open circuit voltage (OCV), i.e., (−0.25−0.14)+(1−0.14)=0.5 V. The OCV of the auxiliary electrode mediated membrane-free redox electrochemical cell ($AEM^2RC$) redox cell was recorded for about 18 h and was found to be stable. The overall charging and discharging reactions are:

$$V^{3+}(\text{catholyte}) + VO^{2+}(V^{4+})(\text{anolyte}) + Sn^{4+}(AE1) + Sn^{2+}(AE2) \underset{\text{discharging}}{\overset{\text{charging}}{\rightleftharpoons}} VO_2^+(V^{5+})(\text{anolyte}) + (V^{2+})(\text{catholyte}) + Sn^{2+}(AE1) + Sn^{4+}(AE2) \quad (4)$$

Figure 6:
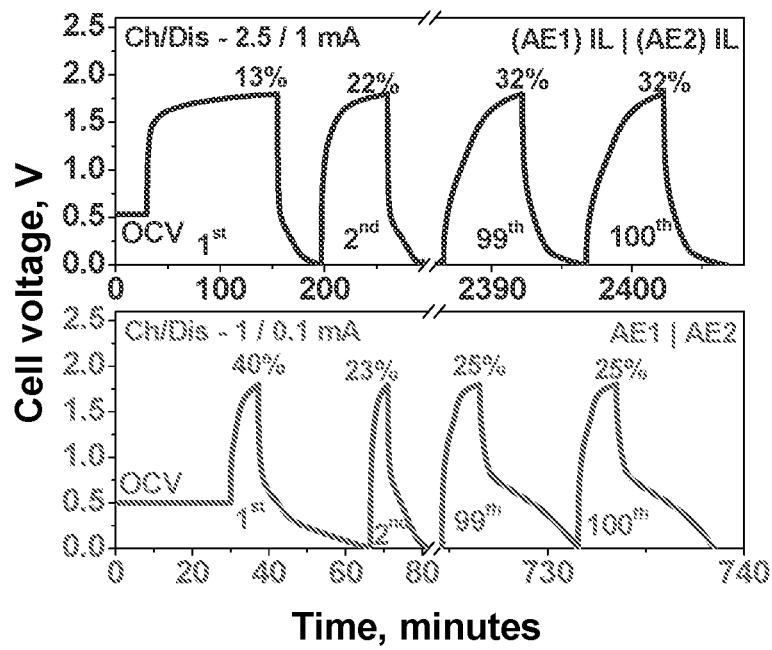
FIG. 6 presents the charge-discharge profile of AEM$^2$ RC up to 100 cycles with charge/discharge efficiency on each cycle (top: Ionomer coated AE pair; bottom: uncoated AE pair).

Charging at 1.8 V and deep discharging at 0 V were performed to ensure cyclability as shown in FIG. 6. With cell charging, higher optical absorption ($\lambda_{abs}$) near 250 nm indicated a higher concentration of $VO_2^+(V^{5+})$ species, with discharging leading to lower optical absorption due to fewer $VO_2^+$ species compared to the charging cycle [14].

XPS results (FIG. 4) revealed the existence of significant proportions (23%) of $Sn^{2+}$ in the anode compartment AE1, which was initially 100% $Sn^{4+}$. The constructed $AEM^2RC$ successfully undergoes charging/discharging cycles but if left in the charged state starts decaying rapidly. This could be mainly due to the fast charge-transfer by direct contact of charged and discharged vanadium ions with the respective AE redox metal centers.

Figure 7:
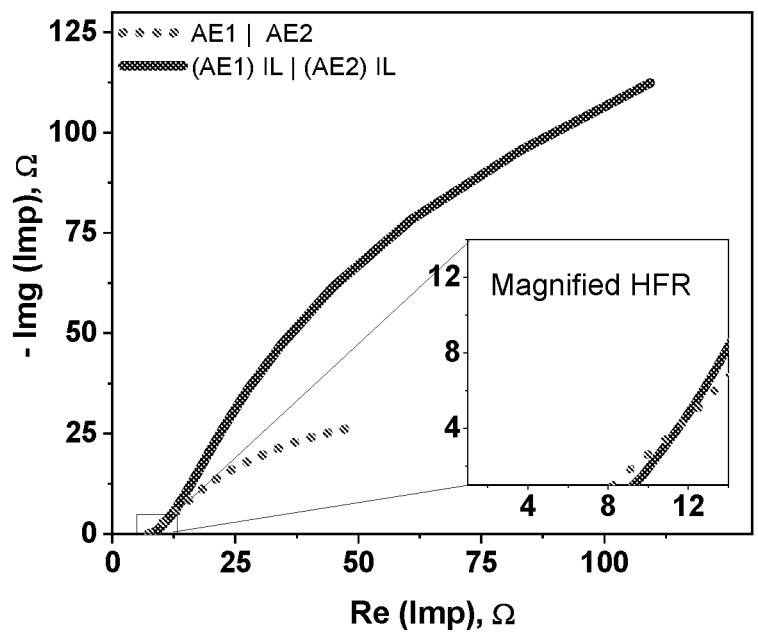
FIG. 7 provides the Nyquist plots of AEM$^2$RC with uncoated and ionomer layer coated AEs.
Figure 8:
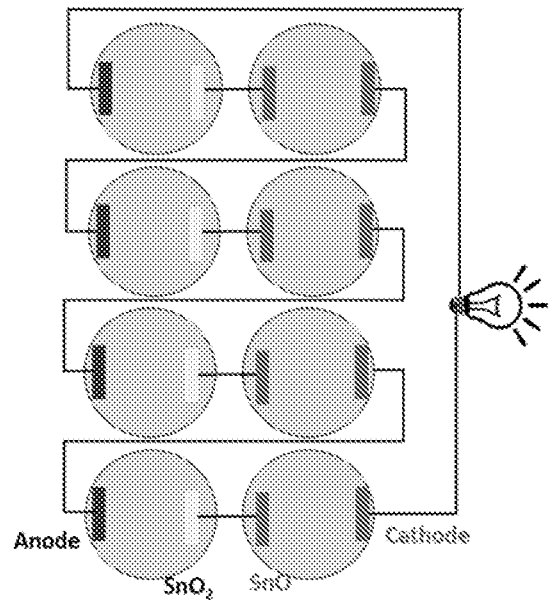
FIG. 8 shows the serially connected 4-cell configuration.
Figure 9:
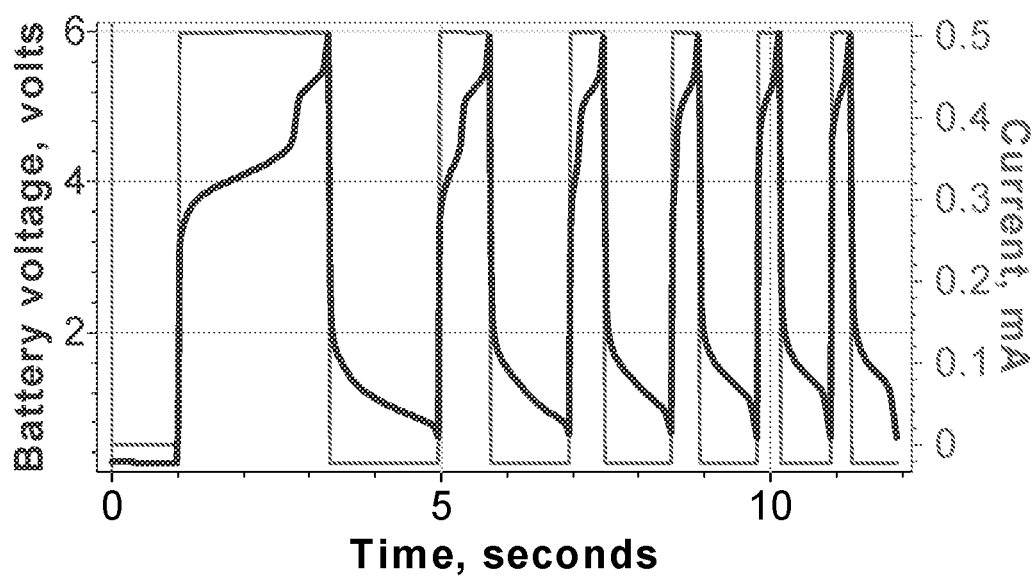
FIG. 9 illustrates the charge-discharge profile of 4-cell battery connected in-series with uncoated AE pairs.

Mitigation of this problem was achieved by the novel route of coating the AEs with an ionomer film as shown in FIG. 7. Two redox cells ($|V^{4+/5+}/Sn^{4+/2+}||Sn^{2+/4+}/V^{3+/2+}|$), in-series with ionomer coated AEs were found to exhibit higher charge/discharge efficiency, related to the vanadium ions isolation from the Sn redox centers (FIG. 7). The impedance response of the $AEM^2RC$ on a Nyquist plot was an incomplete semi-circle (FIG. 8), with a high-frequency intercept of ~7Ω, corresponding to the solution resistance. Attributing the semi-circular impedance response to the electrode processes, it is evident that the electrode polarization resistance for ionomer coated AEs are higher than uncoated AEs. Larger semicircle on the Nyquist plot for the cell with ionomer coated auxiliary electrodes indicates an increased capacitive behavior with ionomer coating. This suggests that the charged species are well separated by ionomer coating, attributes to the increased charge discharge efficiency. The electrode resistance of the AEM²RC with ionomer layer coated AEs is higher compared to the cell with uncoated AEs. The individual chamber's impedance behavior was studied and it was found that the cathode compartment impedance at high and low frequency is higher than that of the anode compartment, as shown in FIG. 9.

Figure 10:
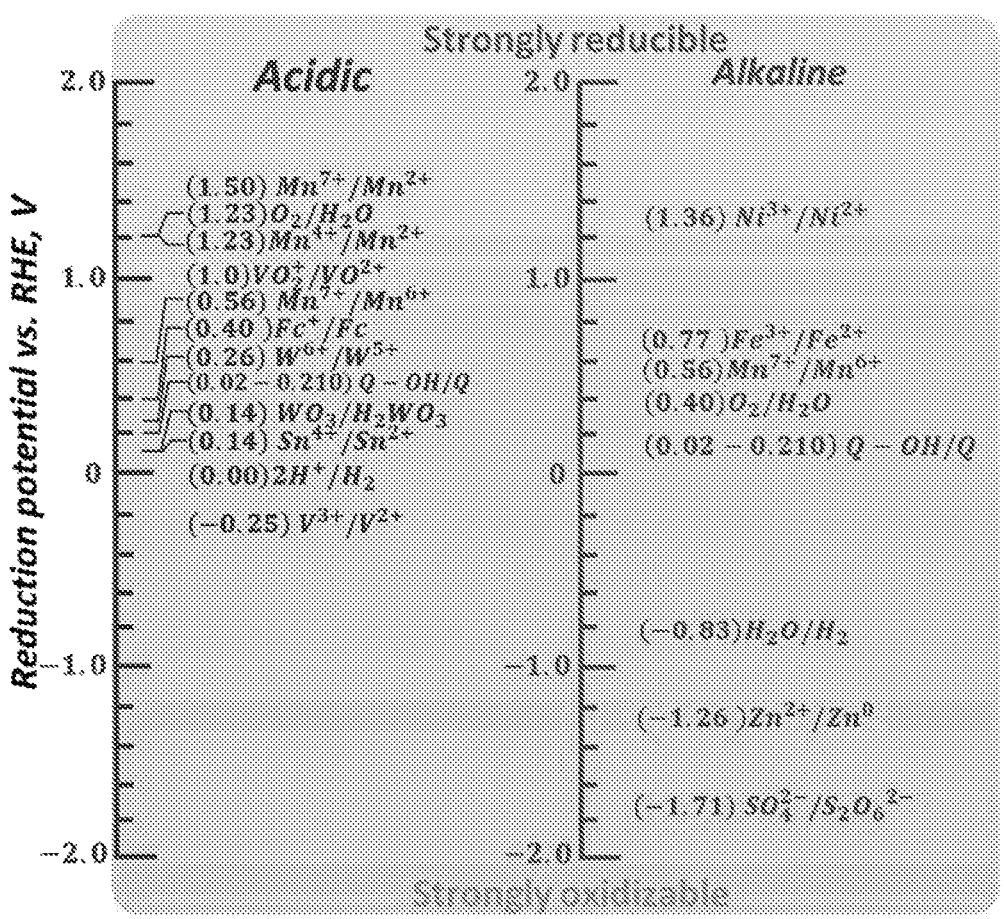
FIG. 10 presents the redox tower diagram of redox couples compatible with acidic and alkaline media.

The essential advantage of the demonstrated membrane-free, AEM²RC, involving separate anode and cathode chambers, is to couple spatially separated oxidation and reduction processes, which is not possible using conventional flow cells with membranes. The degradation issues and cost associated with the membrane are eliminated in the proposed design. A range of redox electrolytes with high cell voltage can be selected based on the reduction potentials in FIG. 10, to achieve high energy density through the novel mechanism described in this work. Since only electrons are transferred between the chambers, a variety of different (alkaline acidic or aqueous/non-aqueous) redox electrolytes can be used in anode and cathode chambers respectively, even if they are physically incompatible.

Figure 11:
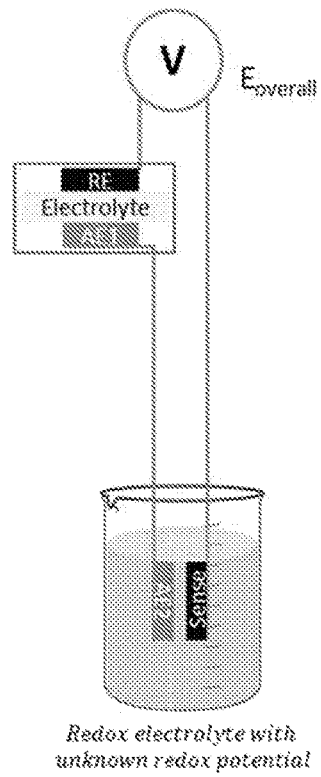
FIG. 11 illustrating the use of the present invention as a possible redox potential indicator.

The sensor application also uses the same principle as that of a battery, except a known redox electrolyte with redox potential (Er) in the reference chamber is gauged against an unknown redox electrolyte whose redox potential is (Ex) using the modified from of Eqn. (3). The schematic of redox potential sensor using present invention is provided in FIG. 11)

$$E_X^0 = E_{Overall} - E_R^0 + E_{AE1}^0 + E_{AE2}^0 \quad (5)$$

EXAMPLES

Figure 12:
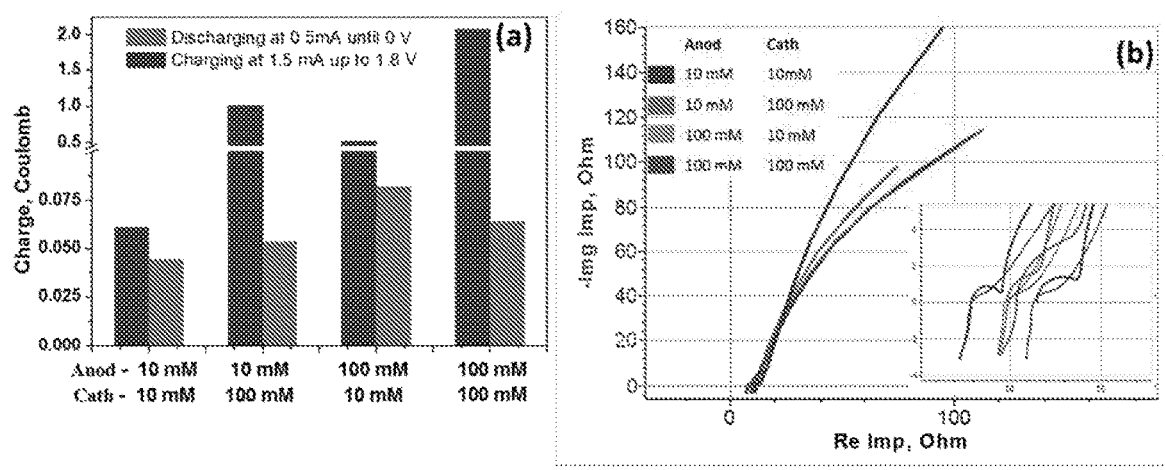
FIG. 12 shows the effect of electrolyte concentration on charge discharge (left panel) and corresponding impedance behavior of AEs material loading (right panel).
Figure 13:
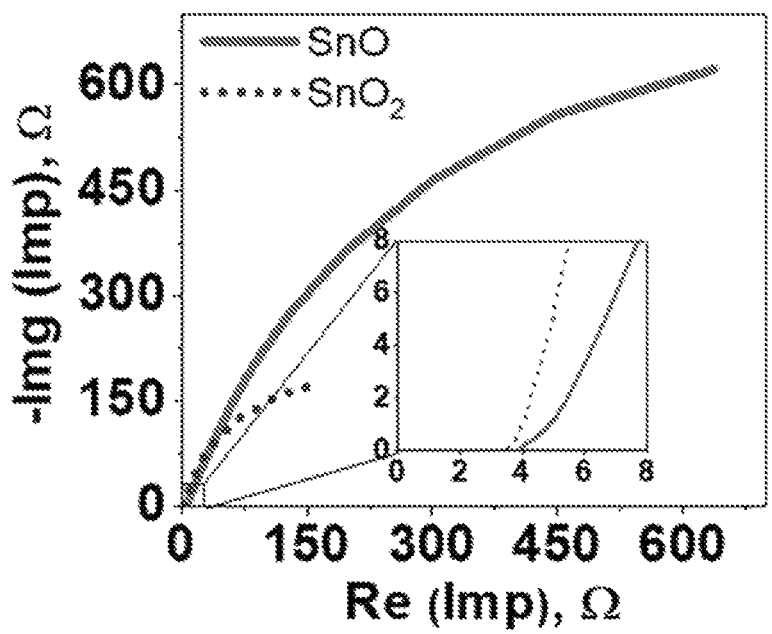
FIG. 13 providing the impedance behavior of individual anode and cathode compartments with oxidized and reduced AE respectively. Impedance behavior using $SnO_2$ (dotted blue) and $SnO$ (solid red) as counter electrodes. Cathode ($V^{3+}/Sn^{2+}$ pair) impedance is higher at both high (inset (c)) and low frequencies.

The scaled up prototypes of the AEM²RC in a 4-cell configuration was constructed in 20 mL and 200 mL chamber volumes as per the schematic presented in FIG. 12. Initially, the scaled up prototypes were constructed with uncoated auxiliary electrode pairs whose charge-discharge profile is shown in FIG. 13.

Figure 14:
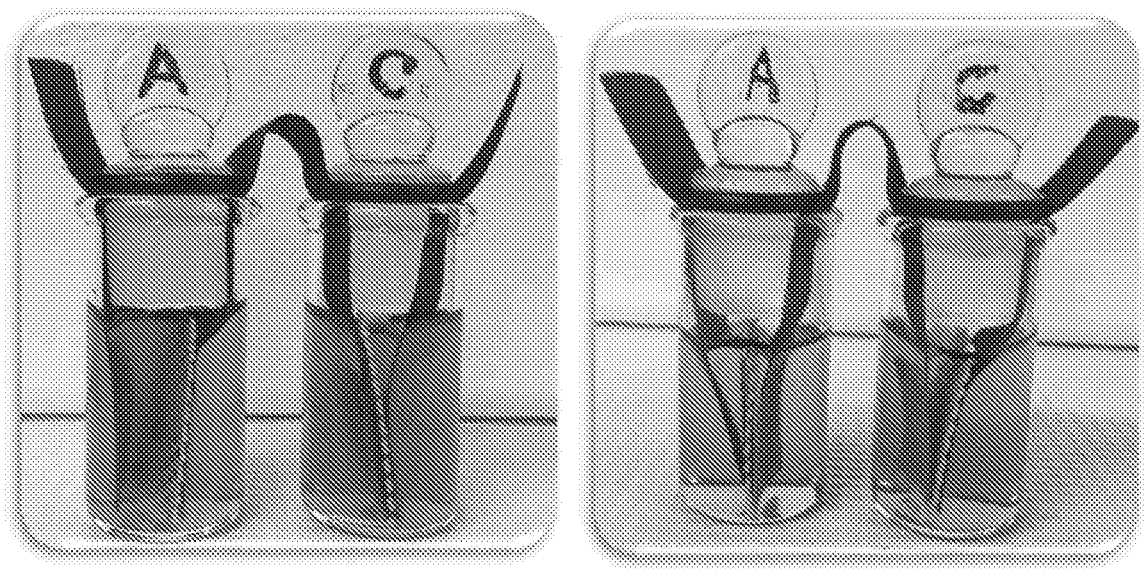
FIG. 14 includes two panels, illustrating (a) an all-aqueous electrolyte configuration and (b) AEM$^2$RC configured with a nonaqueous and aqueous electrolyte in the anode and cathode compartment respectively.

While the constructed all aqueous electrolyte design is presented in FIG. 14 (left), the design was extended further to accommodate aqueous and nonaqueous electrolytes in separate individual chambers. The constructed lab scale prototype with non-aqueous anode electrolyte (Anthraquinone sulfonate (AQS) in N—N' dimethyl formamide (DMF)) and aqueous vanadium based electrolyte is shown in FIG. 14 (right). Herein, quinone (and/or aromatic ketone) fractions derived from crude oil [15], or other sources, can be used as electrolytes in aqueous or nonaqueous forms. These types of chemical species are particularly abundant in "resin" and "asphaltene" fractions of heavy, (bio)degraded oils, such as Canadian oil sands/bitumen [16-19]. Electrolytes can be of varied forms and consist of multiple or single components derived from a variety of sources.

Figure 15:
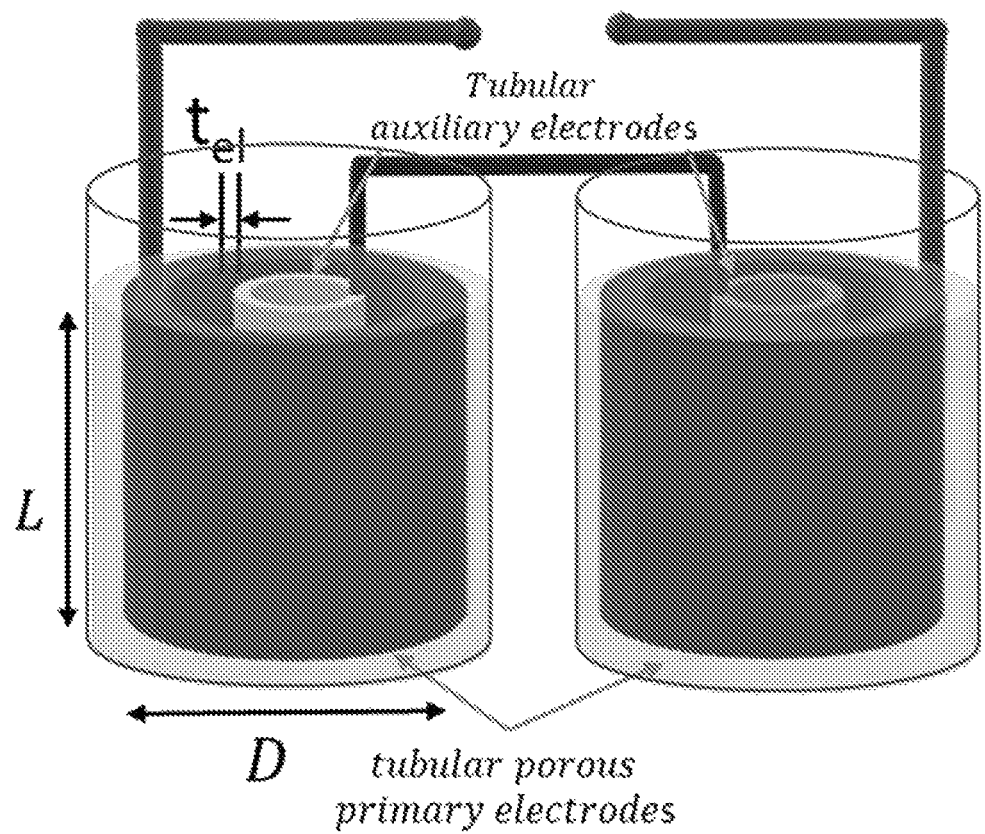
FIG. 15 representing the schematic of concentrically placed porous primary and auxiliary electrodes for increasing the electrochemical reaction surface area.

The efficiency of the energy conversion could be increased when tubular porous electrodes with diameter (D), length (L) and thickness (tel) are employed in the electrolyte chambers as shown in FIG. 15, the obtainable power can be calculated as follows:

Geometric area of the electrode, $A = \pi DL = (D = 40$ cm; $L = 50$ cm) $\sim 6200$ cm².
Active region thickness $t_{el} = 1$ cm
Volume of porous electrode $= \pi DL \times t_{el} = 6200$ cm³
Surface area available, $$\frac{S}{V} = \sim \frac{6(1-\varepsilon)}{d_{charatersitic}};$$

$d_{charatersitic} \sim$ pore diameter $= 1 \ \mu m = 10^{-4}$ cm.

$$\frac{S}{V} = \sim \frac{6(1-0.3)}{10^{-4}} \frac{cm^2}{cm^3}$$

Surface area available $= 4.2 \times 10^4$ cm$^{-1}$

Total surface area of the electrode $= 4.2 \times 10^4$ cm$^{-1} \times 6200$ cm³
$$= \sim 260 \times 10^6 \text{ cm}^2$$
$$= \sim 2.60 \times 10^4 \text{ m}^2.$$

Total current,

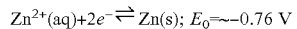
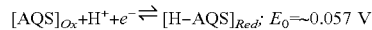

Power=i×V

Based on reasonable assumptions, if 0.5 M electrolytes based on Zn and AQS electrolyte systems was used in a system whose redox potentials are presented as follows, $$Zn^{2+}(aq) + 2e^- \rightleftharpoons Zn(s); \ E_0 = \sim -0.76 \text{ V}$$

$$[AQS]_{Ox} + H^+ + e^- \rightleftharpoons [H-AQS]_{Red}; \ E_0 = \sim -0.057 \text{ V}$$

Without considering the voltage loss at the AE pair reactions, from the energy density calculations, it may take approximately 91 liters of electrolyte to store/discharge 1 kW of power.

$$E(W/L) = \frac{nCFV}{2}; \text{ If } n_c C_c = n_a C_a; 2*0.5$$

$$E(W/L) = \frac{1 \times 26.8 \times 0.817}{2} = \sim 11 \frac{W}{L}$$

~91 L of 0.5 M electrolytes could generate 1 kW.

Alternate auxiliary electrode materials include SnO₂/SnO, Fc⁺/Fc pairs for acidic electrolytes such as vanadium in diluted sulfuric acid solution, or NiOOH/Ni(OH)₂ pairs for alkaline electrolytes such as AQS and Zn in diluted potassium hydroxide solutions.

Alternate electrolytes, include: aqueous electrolytes, such as solutions of iron, zinc, manganese, chromium, AQS, Benzoquinone (BQ), or ferrocyanide; and non-aqueous electrolytes, such as ferrocene, anthraquinone, AQS, Anthraquinone 2,6 disulfonate (AQDS), fluorenone, and other types of organic, and organometallic redox active species.

Alternate primary electrode materials include platinum on carbon catalyst, for example with a loading of 0.25 mg/cm² coated on 5% polytertrafluroethylene (PTFE) wet-proofed carbon cloth (as primary electrodes for liquid electrolytes). Alternately, carbon paper can be used in liquid electrolytes with vanadium, ferrocene, zinc, AQS, AQDS. Carbon felt/foam can be used with semisolid redox electrolytes such as zinc, MnO₂ to increase the contact area.

Sample Energy Density Calculations Based on Non-Aqueous Anode and Aqueous Cathode Redox Electrolytes $I_3^- + 2e^- \rightarrow 3I^-$; $E_0 = 0.536$ V      Cathode:

$[Q]_{Ox} + H^+ + e^- \rightleftharpoons [Q]_{Red}$; $E_0 = \sim -1.0$ V      Anode:

$$E(Wh/L) = \frac{nCFV}{2}; \text{ If } n_c C_c = n_a C_a; 2*0.5$$

$$E(Wh/L) = \frac{1 \times 26.8 \times 1.043}{2} = \sim 11 \frac{Wh}{L}$$

~72 L of 0.5M electrolytes could generate 1 kWh.
~720 L or (170 Gal) of 0.5M electrolytes could generate 10 kWh.

TABLE 1

List of redox electrolytes, auxiliary electrode pair and primary electrode combinations

| Redox electrolyte | Auxiliary electrode pair | Primary electrodes |
|---|---|---|
| All vanadium | $SnO_2/SnO$ | Pt/C coated on carbon |
| Zn/Fe | | cloth, plain carbon paper, |
| AQS/Fe | | plain carbon cloth |
| BQ/Zn | | |
| BQ/Zn | | |
| Fe/Cr | | |
| All vanadium | $NiOOH/Ni(OH)_2$ | $MnO_2$ coated on carbon, |
| AQS/Fe | | plain carbon paper, plain |
| BQ/Zn | | carbon cloth |
| BQ/Zn | | |
| Fe/Cr | | |
| Quinone/Iodine | | |
| Zinc particles-quinone based electrolytes | $SnO_2/SnO$ | Porous carbon foam, carbon felt etc. |
| $MnO_2$ particles-quinone | | |
| Zinc particles-quinone based electrolytes | $NiOOH/Ni(OH)_2$ | Porous carbon foam, carbon felt etc. |

In some embodiments, the redox electrolyte may be circulated through porous concentrically placed primary and auxiliary electrodes, for example so as to increase electrochemical surface area for higher efficiency. The redox electrolyte may for example be circulated through porous concentrically placed primary and auxiliary electrodes separated by a chemically inert insulating mesh. In some embodiments, one of the redox electrolytes may be a gel-type electrolyte with a known redox potential situated between the primary and auxiliary electrodes. In an alternative embodiment, an end of a primary and auxiliary electrode may be used as a sensing probe, immersed in a redox electrolyte with an unknown redox potential, thereby adapting the device for use as a redox voltage sensor.

Chemicals and electrodes. For the exemplary embodiments described above, Vanadyl sulfate 97% and anthraquinone-2 sulfonate (ACS grade from Sigma Aldrich) were used to prepare the electrolyte solutions. 37% sulfuric acid stock solution (ACS grade from Sigma Aldrich), was used to prepare supporting electrolyte. For non-aqueous studies, N—N' dimethylformamide was used as solvent. Tin(II) oxide (SnO, particle size >60 μm) and Tin (IV) Oxide ($SnO_2$, particle size >10 μm) powders from Alfa Aesar, polytetrafluoroethylene (PTFE) dispersion (30 wt. %) from E.I. dupont De Nemours & Co. Inc., graphite powder, isopropyl alcohol and water were used in making the slurry for the preparation of auxiliary electrode pair. The procedure can be found elsewhere [20]. The loading of metal oxides was 60 mg/cm² along with 10 wt. % conducting graphite powder and 15 wt. % PTFE binder.

Electrochemical characterization. Cyclic voltammetry (CV) of half-cell and full cell devices was performed using a Bio-logic VSP 300 potentiostat. Glassy carbon was used as a working electrode, SnO and $SnO_2$ were used as as counter electrodes to ease electron acceptance and release in the custom made half-cells with respect to a reference hydrogen electrode (RHE) comprises of Pt foil immersed in 0.5 M sulfuric acid with bubbling hydrogen gas at 1 atm pressure. Typical CV experiments were performed at a scan rate of 20 mVs⁻¹. Electrochemical impedance spectroscopy (EIS) experiments was carried out in the frequency range of 1 MHz-1 Hz at open-circuit conditions with a 10 mV ac amplitude. The EIS data was analyzed via equivalent circuit fitting using EC-lab® software (Bio-logic, France). Charge-discharge cycles (1.8 V/0 V) were performed using galvanostatic cycling with potential limitation (GCPL) technique in EC-Lab software. Cyclic voltammetry studies of redox electrolytes were carried out using three-electrode configuration in non-aqueous media. Large potential window scans were performed with −2 V to +1 V vs. Ag/Ag+ non-aqueous reference electrode (CH instruments). The working electrode is 3 mm dia. glassy carbon rod and counter electrode is a piece of platinized platinum.

UV-VIS characterization. The electrolyte solution absorption spectra in charged and discharged states were obtained using a Varian Cary 300 Bio double beam UV-Vis spectrophotometer. The absorption spectrum were recorded from 200 nm to 800 nm. The electrolytes from both chamber were diluted to avoid the saturation of optical detector.

XPS characterization. Room-temperature XPS experiments were performed at nanoFAB facility (University of Alberta) using Kratos Axis spectrometer with monochromatized Al Kα (hu=1486.71 eV). The spectrometer was calibrated by the binding energy (84.0 eV) of Au 4f7/2 with reference to Fermi level. The pressure of analysis chamber during experiments is better than 5×10⁻¹⁰ Torr. A hemispherical electron-energy analyzer working at the pass energy of 20 eV was used to collect core-level spectra while survey spectrum within a range of binding energies from 0 to 1100 eV was collected at analyzer pass energy of 160 eV. Charge effects were corrected by using C 1s peak at 284.8 eV. A Shirley background was applied to subtract the inelastic background of core-level peaks. Non-linear optimization using the Marquardt Algorithm (Casa XPS) was used to determine the peak model parameters such as peak positions, widths and peak intensities. The model peak to describe XPS core-level lines for curve fitting was a product of Gaussian and Lorentzian functions (GL (50)). UPS was performed at nanoFAB facility using Kratos Axis Ultra spectrometer. UPS was measured with He I source (hv=21.2 eV). The sample was −10 V bias on. The power for UPS was 3 kV×20 mA (60 W). Compositions were calculated from the survey spectra using the major elemental peaks and sensitivity factors provided by the database. CASA XPS was used for component analysis to fit the spectra of C1s with peaks related to different chemical bonds. A CasaXPS (academic) program was used to analyze the data. Standard reduction potentials of redox active elements that are usable in the AEM²RC is presented in the redox tower diagram in FIG. 10 [21-23].

Nuclear magnetic resonance spectra studies. NMR instrument from Bruker AVIII-400"RDQ" BBFO Probe Ultrashield Magnet were used in this study. NMR studies were carried out by mixing 50 vol % sample with 50 vol % $CDCl_3$ (Sigma Aldrich) as proton source for non-aqueous media.

Charging and Discharging Reactions in Conventional Vanadium Redox Flow Battery[13]

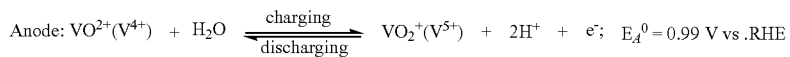

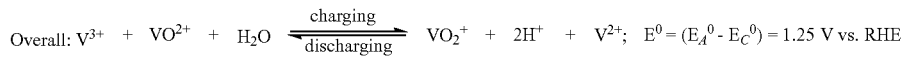

System Level Description for 10 kW AEM²RC

The system consists of two storage tanks for anolyte and catholyte for storing and retrieving electrochemical energy as described in FIG. 16.

Each cell consists of a pair of primary electrodes and a pair of auxiliary electrodes.

Each cell is connected in series to build-up the voltage.

The DC current is fed to the AEM²RC where the electrolytes are converted to high energy fluids. To better utilize the electrolyte, circulator pumps in both tanks need to be operated at regular intervals.

The primary electrode is used to charge and discharge the cell, during charging, anolyte is electrochemically oxidized and catholyte is electrochemically reduced.

Auxiliary electrodes are used to transport electron when the auxiliary electrodes undergo counter electrochemical reactions respectively.

During discharging, the applied voltage and current electrochemically reduce the anolyte and oxidizes the catholyte to generate electrical output.

When electricity is needed, the chemical energy stored in high energy electrolytes are converted to DC power.

Separate tanks can be used when we need power-on-demand, so that circulating the electrolyte leads to power generation. This also avoid some minor self-discharge.

Self-discharging problem can be avoided by electrically disconnecting the anode and cathode after charging in the resent design.

Features

Separate tank design allows power on demand and provision to electrically disconnect anode and cathode chamber to reduce self-discharge problem.

Electrochemical charging and discharging are spontaneous in AEM²RC. Hence, they are exothermic.

During urgent power demand and charging, the incoming DC power can be fed directly to the output converter to avoid the delayed response of the AEM²RC. One the power is surplus, the electrolytes can be charged to store energy.

TABLE 2

Approximate cost and performance characteristics (Scaled-up for 10-12.5 kW)

| Item | Description | Cost, in C$ |
| --- | --- | --- |
| Foot print | 2.5 × 2.5 m². | Not included |
| Area of each electrode | (25 × 25) 5000 cm² (0.5 m²) | |
| Primary electrode | Catalyst coated carbon cloth electrode (50 m²) C$300/m² | 15000 |
| Auxiliary electrode Ni(OH)₂ | 7.5 kg each on SS mesh @ C$5/kg | 50 |
| Auxiliary electrode NiOOH | 7.5 kg each on SS mesh @ C$10/kg | 100 |
| Stainless steel mesh | 50 m² @ C$15/m² | 750 |
| Concentration of the electrolyte | 500 mM (Iodine and quinone) | |
| Storage tank | 1000 L PVC containers × 2 | 500 |
| Tubing & plumbing | 10 meters @ C$10/m; | 100 |
| Anolyte | 0.5 M/5M quinone (9 kg of quinone\|C$25/kg) 2250 (975 kg of TBAH\|C$1.5/kg) 1000 (NN' dimethylformamide 750 liter\| C$1000 for 1 ton) | 4250 |
| Catholyte | 0.5 M/5M Iodine (95 kg of iodine\|C$60/kg) 5700 (62.25 kg of KI\|C$0.75/kg) 60 (105.19 kg of KOH\|C$1.5/kg) 170 (H₂O 750 liter\|C$100 for 1000 liters) | 7000 |
| Flow rate of electrolyte | Circulation at 10 slpm (Two pumps @ C$1000) | 1000 |
| Storage volume | 750 liters × 2 | |
| DC-DC converter + battery management system (BMS) | For 10 kWh (C$350 + C$1000) = C$1350 | 1350 |
| Cables/connections/fixtures | C$1000 | 1000 |
| Charging time | 5-7 hours | |
| Number of cells | 50 | |
| Open circuit voltage | 50.0 V | |
| Maximum charge voltage | 80.0 V to 90.0 V | |
| Minimum voltage on discharge | 30.0 V | |
| Maximum charge current | 40.0 A (@ 8.0 mA/cm²) | |
| Maximum discharge current (continuous) | 25.0 A (@ 5.0 mA/cm²) | |
| Rated capacity for 8-10 hours | 10-12.5 kWh | |
| Power out put | DC | |
| | Total | 31100 |
| Service Life | 20,000 hours | <0.25/kWh |

System Level Outlook

The energy density of the proposed system is based on the volume of the redox electrolytes involved, reduction potentials of the redox couples, concentration of the redox electrolytes, number of electrons involved in the redox reaction. The proposed system generates only DC power through electrochemical energy conversion. Hence, a DC-DC converter is required to convert the output power from the redox cell. The current technology required only abundant and cheaper materials than conventional redox flow battery, which brings down the cost of the system considerably less than that of flow battery system with expensive membrane and metal based redox system. Hence, metal-free redox electrolytes are tested in the second phase of the project. The energy density of the AEM$^2$RC depends on the volume of the electrolytes and power density depends on the dimensions of the electrodes. Conveniently, here energy and power is decoupled in the system similar to redox flow battery system.

Advantages

The flow rate, electrode area, storage tank capacity, DC-DC converter, service life, etc., are similar to that of conventional redox flow battery, except that, we have eliminated the use of ion-exchange membrane. Instead of this, we have incorporated auxiliary electrodes, which has following advantages.

No membrane used in the system, hence, the cost of the membrane is eliminated.

Mass-transport restriction across the membrane is eliminated. Hence, flexible electrolytes can be used in anode and cathode chamber.

No separate storage tanks required. Stack and electrolyte storage can be used in one container for anode and cathode.

Agitation at regular interval is sufficient. No constant electrolyte circulation is required. Hence, pumping loss can be kept to a minimum.

Zero pressure gradient is observed due to the absence of bipolar plates or flow channel. Hence, pumping power is significantly lower than conventional redox flow battery.

Previous design of AEM$^2$RC was tested using all-aqueous vanadium based redox electrolyte. Owing to the cost and less abundant nature, vanadium is often not desired candidate for redox electrolyte application. High concentration of electrolyte is required to realize high energy density, which necessitates the use of low pH acidic supporting electrolyte. High concentration electrolytes also have crystallization issues and thus has very limited operational temperature window. Higher concentration of electrolyte may require careful engineering of electrode surface for improved wettability. The supporting electrolyte was 1 M sulfuric acid, which leads to many corrosive issues of the components used. Due to the major problems listed above, non-metallic and non-aqueous based redox electrolytes are often preferred. Organic redox electrolyte is used as a negative reactant with high solubility in non-aqueous media with reduced cost per kWh compared to vanadium is often investigated.

Here, we propose a non-aqueous redox electrolyte with a mixture of quinone based molecules. Lab-scale experiments were demonstrated as depicted in FIG. 17.

A mixture of three different polycyclic aromatic hydrocarbon (PAH) quinones (Acenapthhenequinone, Phenanthrenequinone, and 1,2-dihydroxyanthraquinone) were tested. Iodine ($I_3^-/I^-$) was used as catholyte in alkaline aqueous media, where the redox behavior is presented in FIG. 18.

The capacity retention of AEM$^2$RC is shown from the charge-discharge characteristics shown in FIG. 19.

The cyclability study of the AEM$^2$RC demonstrated for 100 cycles reveals that AEM$^2$RC with the hybrid reactants had an increased coulombic efficiency that is ~2.5 time higher than the all-aqueous reactants as presented in FIG. 20.

The chemical structure of quinones used in this study as shown in FIG. 21(a). Upon redox (charging) reaction as proposed in FIG. 21(b), the quinone aromatic signals in NMR spectra sharpen, which are identified with an asterisk as shown in FIG. 21(c). This sharpening may be due to the loss of the aromatic hydroxyls with the oxidation reaction which have become quinoid as shown in the NMR spectrum.

The redox studies exhibited an overall single redox potential for these mixed quinone electrolyte in NN'-dimethylformamide with tetrabutylammonium hydroxide as supporting electrolyte.

The auxiliary electrode pair in Ni(OH)$_2$/NiOOH.

Since AEM$^2$RC operates without any mass transport restrictions, The hybrid design of non-aqueous anode and aqueous cathode is possible with the opportunity of replacing expensive metal electrolytes with cheaper organic electrolyte. The alkaline electrolyte on cathode side mitigates corrosion issues associated with the acidic electrolyte. Non aqueous media increases the solubility limit of anolyte thus an increased energy density is possible.

TABLE 3

Application space and cost metrics

| 10 kWh conversion system | Efficiency | Required infrastructure | Cost of 10 kWh, C$ |
|---|---|---|---|
| Area required for 10 kWh from Solar cells [24] | <20% | 1000 sqft illumination | 0.39 |
| Hydrogen required for 10 kWh from fuel cells [25, 26] | 40-50% | ~550 grams of hydrogen | 2.00 |
| Location specific area required for 10 kWh from windmill [27] | ~50% | ~10 m/s wind flow | 1.10 |
| Flow and height requirement for 10 kWh from hydro [28] | ~80% | 2.5 m net head water that flows at 600 liter/second. | 11.4 |

Real Application Space Scenario

Deployment in Solar Fields

Because of the geographical location, Southern Alberta always receives a decent amount of sunlight for 8-10 months of the year [29]. Alberta has the second highest potential to produce solar energy in all of Canada, receiving more solar irradiation than any other province or territory other than Saskatchewan. According to data from National Resources Canada, the average solar system in Alberta can produce 1276 kWh of electricity per kW of solar panels per year. Calgary-based Perimeter Solar located about 125 kilometers south of Calgary, is building 130 MW, a $200-million solar facility. The AEM$^2$RC can be linked to the solar panels to generate power when sun shines.

Hydrogen Gas from Oil Well Converted to Energy

Natural gas resource is quite important to the economic development of the province, where Alberta produced 10.5 billion cubic foot/day of natural gas in 2018. Contracted use of hydrogen from oil well can be done with the excess of flared gas. Local legislations also gets tighter for gas flaring at oil fields in some locations in North America. A similar case can be planned in the Superb oil field in Saskatchewan, Canada, where hydrogen gas is taken out from the oil well by injecting steam and air leaving the $CO_2$ underground. Proton technologies use their membrane to separate hydrogen gas, but the fuel cell employed could produce power to be stored in the $AEM^2RC$.

Windmill Energy Storage

Alberta ranks third in Canada with an installed wind energy capacity of 1,685 MW. Regions with an average annual wind speed of at least 6-7 m/s (22-25 km/h) or greater at a height of 80 m above the ground (the hub height) are considered potentially economically viable areas for commercial wind energy development. Many best suitable sites are found in the southern part of Alberta. Wind farms such as Oldman1, Oldman2, Old elm, Sharp hills, and Windy point wind farms generate nearly 700 MW of energy of which part of the energy can be stored and supplied during peak shaving time.

Hydroelectric Energy Storage

The hydroelectric potential of the province lies mostly in the Athabasca, Peace and Slave River basins. The remaining is in the Red Deer River basin and the North and South Saskatchewan River basins within the southern part of the province. Combining, they have the potential to generate 42000 GWh/year. Hydroelectric power is site specific and the river corridors are important habitat for terrestrial and aquatic ecosystem. Therefore, storing the energy and using it at the spot eliminates the need of power transmission lines without disturbing the environment. TransAlta and Atco power are the main players in generating hydroelectric power in Alberta, operating mainly from South of Alberta, totaling nearly 900 MW of power.

Over the past 10 years, Albertans were paying between $48 and $90/MWh for the coal-fired electricity. The deployment of such innovative technology creates an independency from fossil-based energy and reduce GHG emission.

INCORPORATED REFERENCES

1. Larcher, D.; Tarascon, J. M. Towards Greener And More Sustainable Batteries For Electrical Energy Storage. *Nat. Chem.* 2015, 7, 19-29.
2. Zhou, C.; Bag, S.; Thangadurai, V. Engineering Materials for Progressive All-Solid-State Na Batteries. *ACS Energy Lett.* 2018, 3, 2181-2198.
3. UNFCCC. Conference of the Parties (COP). ADOPTION OF THE PARIS AGREEMENT—Conference of the Parties COP 21. *Adopt. Paris Agreement. Propos. by Pres.* 2015, 21932, 32. (https://unfccc.int/process-and-meetings/the-paris-agreement/d2hhdC1pcy, (accessed on 18 Jun. 2019.))
4. Park, M.; Ryu, J.; Wang, W.; Cho, J. Material Design and Engineering of Next-Generation Flow-Battery Technologies. *Nat. Rev. Mater.* 2016, 2, 16080, 1-18.
5. Leung, P. K. et al. Membrane-Less Hybrid Flow Battery Based on Low-Cost Elements. *J. Power Sources* 2017, 341, 36-45.
6. Venkatesan, S. V.; El Hannach, M.; Holdcroft, S.; Kjeang, E. Probing Nanoscale Membrane Degradation in Fuel Cells Through Electron Tomography. *J. Memb. Sci.* 2017, 539, 138-143.
7. Karan, K. Interesting Facets of Surface, Interfacial, and Bulk Characteristics of Perfluorinated Ionomer Films. *Langmuir* 2019, DOI:10.1021/acs.langmuir.8b03721
8. Bae, C.; Chakrabarti, H.; Roberts, E. A Membrane Free Electrochemical Cell Using Porous Flow-Through Graphite Felt Electrodes. *J. Appl. Electrochem.* 2008, 38, 637-644.
9. Kjeang, E.; Michel, R.; Harrington, D. A.; Djilali, N.; Sinton, D. A Microfluidic Fuel Cell with Flow-Through Porous Electrodes. *J. Am. Chem. Soc.* 2008, 130, 4000-4006.
10. Leung, P. K.; Martin, T.; Shah, A. A.; Anderson, M. A.; Palma, J. Membrane-less Organic-Inorganic Aqueous Flow Batteries with Improved Cell Potential. *Chem. Commun.* 2016, 52, 14270-14273.
11. Braff, W. A.; Bazant, M. Z.; Buie, C. R. Membrane-less Hydrogen Bromine Flow Battery. *Nat. Commun.* 2013, 4, 1-6.
12. Navalpotro, P.; Palma, J.; Anderson, M.; Marcilla, R. A Membrane-Free Redox Flow Battery with Two Immiscible Redox Electrolytes. *Angew. Chemie-Int. Ed.* 2017, 56, 12460-12465.
13. Soloveichik, G. L. Flow Batteries: Current Status and Trends. *Chem. Rev.* 2015, 115, 11533-11558.
14. Brooker, R. P.; Bell, C. J.; Bonville, L. J.; Kunz, H. R.; Fenton, J. M. Determining Vanadium Concentrations Using the UV-Vis Response Method. *J. Electrochem. Soc.* 2015, 162, A608-A613.
15. Bennett, B., and S. R. Larter, The isolation, occurrence and origin of fluorenones in crude oils and rock extracts, *Org. Geochem.* 2000, 31(1), 117-125.
16. Moschopedis, S. E., and J. G. Speight, Oxygen functions in asphaltenes, Fuel 1976, 55(4), 334-336.
17. Moschopedis, S. E., J. F. Fryer, and J. G. Speight, Investigation of the carbonyl functions in a resin fraction from Athabasca bitumen, Fuel 1976, 55(3), 184-186.
18. Radović, J. R., T. B. P. Oldenburg, and S. R. Larter, Chapter 19—Environmental Assessment of Spills Related to Oil Exploitation in Canada's Oil Sands Region, in Oil Spill Environmental Forensics Case Studies, Ed. by S. A. Stout and Z. Wang, 2018, pp. 401-417, Butterworth-Heinemann.
19. Senthil Velan, V.; Velayutham, G.; Rajalakshmi, N.; Dhathathreyan, K. S. Influence Of Compressive Stress On The Pore Structure of Carbon Cloth Based Gas Diffusion Layer Investigated by Capillary Flow Porometry. *Int. J. Hydrogen Energy* 2014, 39, 1752-59.
21. Atkins, P. & Paula, J. *Physical Chemistry*. (W. H. Freeman Co., New York., 2010).
22. Soloveichik, G. L. Flow Batteries: Current Status and Trends. *Chem. Rev.* 2015, 115, 11533-11558.
23. Li, X.; Zhang, H.; Mai, Z.; Zhang, H.; Vankelecom, I. Ion Exchange Membranes for Vanadium Redox Flow Battery (VRB) Applications. *Energy Environ. Sci.* 2011, 4, 1147.
24. Service R. F., Solar plus batteries is now cheaper than fossil power, *Science* 2019, 365, 108.
25. Energy transmission, storage, and distribution infrastructure, Implementation report card https://www.energy.gov/sites/prod/files/2016/01/f28/mv_guide_4_0.pdf, Accessed on 8 Aug. 2020.
26. Nobody in the fuel cell industry has ever made a profit—this CEO could be the first https://gz.com/135032/fuelcell-energy-fuel-cell-profit/. Accessed on 8 Aug. 2020.
27. Wind Energy Is One of the Cheapest Sources of Electricity, and It's Getting Cheaper https://blogs.scientificamerican.com/plugged-in/wind-energy-is-one-of-the-cheapest-sources-of-electricity-and-its-getting-cheaper/. Accessed on 8 Aug. 2020.
28. How much hydropower power could I generate from a hydro turbine? https://www.renewablesfirst.co.uk/hydropower/hydropower-learning-centre/how-much-power-could-i-generate-from-a-hydro-turbine/. Accessed on 8 Aug. 2020.

29. Complete Guide For Solar Power Alberta 2020 https://www.energyhub.org/alberta/. Accessed on 8 Aug. 2020.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Terms such as "exemplary" or "exemplified" are used herein to mean "serving as an example, instance, or illustration." Any implementation described herein as "exemplary" or "exemplified" is accordingly not to be construed as necessarily preferred or advantageous over other implementations, all such implementations being independent embodiments. Unless otherwise stated, numeric ranges are inclusive of the numbers defining the range, and numbers are necessarily approximations to the given decimal. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing. Citation of references herein is not an admission that such references are prior art to the present invention. Any priority document(s) and all publications, including but not limited to patents and patent applications, cited in this specification, and all documents cited in such documents and publications, are hereby incorporated herein by reference as if each individual publication were specifically and individually indicated to be incorporated by reference herein and as though fully set forth herein. The invention includes all embodiments and variations substantially as hereinbefore described and with reference to the examples and drawings.

The invention claimed is:

1. A galvanic cell comprising:
ionically isolated cathodic and anodic half cells, the cathodic half cell comprising a primary cathode and an auxiliary anode in a cathodic electrolyte, the anodic half cell comprising a primary anode and an auxiliary cathode in an anodic electrolyte, the cathodic electrolyte being ionically isolated from the anodic electrolyte; the primary cathode comprising a primary cathode terminal, and the primary anode comprising a primary anode terminal, the primary cathode and anode terminals being electrically connected through an external storage and discharge mechanism; and the auxiliary anode being electrically coupled to the auxiliary cathode by an electron conductor, the cathodic half cell being thereby electrically coupled to the anodic half cell through the electron conductor to form a reversible circuit with reversible half cell reactions that alternatively mediate electrochemical energy storage reactions and electrochemical energy discharge reactions.

2. The galvanic cell of claim 1, wherein the cathodic electrolyte comprises $V^{3+}$ and $V^{2+}$, and wherein the anodic electrolyte comprises $VO^{2+}$ and $VO^{2+}$.

3. The galvanic cell of claim 2, wherein to mediate electrochemical energy storage by the electrochemical energy storage reactions, $VO^{2+}$ in the anodic electrolyte is oxidized at the primary anode to form $VO^{2+}$, and $V^{3+}$ in the cathodic electrolyte is reduced at the primary cathode to form $V^{2+}$.

4. The galvanic cell of claim 3, wherein to mediate electrochemical energy discharge by the electrochemical energy discharge reactions, $VO^{2+}$ in the anodic electrolyte is reduced at the primary anode to form $VO^{2+}$, and $V^{2+}$ in the cathodic electrolyte is oxidized at the primary cathode to form $V^{3+}$.

5. The galvanic cell of claim 4, wherein the cathodic electrolyte and the anodic electrolyte are vanadyl sulfate solutions in an acidic supporting electrolyte.

6. The galvanic cell of claim 5, wherein the auxiliary anode and/or auxiliary cathode comprises: a redox metal oxide or a mixed metal oxide; or, wherein the auxiliary anode comprises tin IV oxide ($SnO_2$); or, wherein the auxiliary cathode comprises tin II oxide (SnO); or, wherein the auxiliary anode and/or auxiliary cathode comprise a composite electrode comprising a carbonaceous substrate material; or, wherein the auxiliary anode and/or auxiliary cathode comprise an ionomer film coating covering the auxiliary anode and/or auxiliary cathode; or, wherein the auxiliary anode and/or auxiliary cathode comprises a redox gel material.

7. The galvanic cell of claim 6, wherein the auxiliary anode comprises tin IV oxide ($SnO_2$), and the auxiliary cathode comprises tin II oxide (SnO), wherein to mediate electrochemical energy storage by the electrochemical energy storage reactions, a portion of the tin IV in the auxiliary anode is reduced to tin II, and a portion of the tin II in the auxiliary cathode is oxidized to tin IV.

8. The galvanic cell of claim 7, wherein to mediate electrochemical energy discharge by the electrochemical energy discharge reactions, a portion of the tin II in the auxiliary anode is oxidized to tin IV, and a portion of the tin IV in the auxiliary cathode is reduced to tin II.

9. The galvanic cell of claim 6 wherein the ionomer film coating comprises an ion conductive material that is an electronic insulator; a perfluorosulfonic acid (PFSA) ionomer dispersion; a polyethylene oxide (PEO); or, a polypropylene oxide (PPO).

10. The galvanic cell of claim 6, wherein the redox gel material comprises an ion conducting and electron conducting media supported on a substrate or a porous matrix; or a ferrocene (Fc) based gel; or an ionic liquid based gel; or, a redox active polymer.

11. The galvanic cell of claim 10, wherein the redox active polymer comprises a conjugated polymer backbone.

12. The galvanic cell of claim 11, wherein the conjugated polymer backbone comprises a poly aniline (PANI); a poly (3,4-ethylenedioxythiophene):poly(4-styrenesulfonate) (PEDOT:PSS) and/or wherein the conjugated polymer backbone comprises a redox active group substituent.

13. The galvanic cell of claim 12, wherein the redox active group substituent is a quinone, imide, carbazole, or ferrocene.

14. The galvanic cell of claim 1, wherein the cathodic electrolyte is circulated from a cathodic electrolyte storage tank through the cathodic half cell, and the anodic electrolyte is circulated from an anodic electrolyte storage tank through the anodic half cell.

15. The galvanic cell of claim 1, wherein the cathodic and anodic electrolytes comprise a redox electrolyte pair, the auxiliary anode and auxiliary cathode comprise an auxiliary electrode pair, and the primary cathode and primary anode comprise a primary electrode pair, and:

a) the redox electrolyte pair comprises:
   i) vanadyl species, or
   ii) zinc (Zn) and iron (Fe) species, or
   iii) anthraquinone sulfonate species (AQS) and Fe species, or
   iv) benzoquinone (BQ) and Zn species, or
   v) Fe and chromium (Cr) species;
   the auxiliary electrode pair comprises $SnO_2$ and SnO; and
   the primary electrode pair comprises:
   i) platinum on carbon catalyst (Pt/C) coated on carbon cloth, or
   ii) plain carbon paper, or
   iii) plain carbon cloth; or
b) the redox electrolyte pair comprises:
   i) vanadyl species, or
   ii) AQS and Fe species, or
   iii) BQ and Zn species, or
   iv) Fe and Cr species, or
   v) quinone and iodine species;
   the auxiliary electrode pair comprises NiOOH and $Ni(OH)_2$; and
   the primary electrode pair comprises:
   i) $MnO_2$ coated on carbon, or
   ii) ii) plain carbon paper, or iii) plain carbon cloth; or,
c) the redox electrolyte pair comprises a quinone-based electrolyte comprising;
   i) zinc particles; or
   ii) $MnO_2$ particles;
   the auxiliary electrode pair comprises $SnO_2$ and SnO; and
   the primary electrode pair comprises porous carbon foam or carbon felt; or,
d) the redox electrolyte pair comprises a quinone-based electrolyte comprising zinc particles; and, the auxiliary electrode pair comprises NiOOH and $Ni(OH)_2$; and, the primary electrode pair comprises porous carbon foam or carbon felt.

16. The galvanic cell of claim 15, wherein the redox electrolyte is circulated through porous concentrically arranged primary and auxiliary electrode pairs.

17. The galvanic cell of claim 16, wherein the primary and auxiliary electrode pairs are separated by a chemically inert insulating mesh.

18. The galvanic cell of claim 15, wherein the redox electrolyte pair comprises a gel-type electrolyte.

19. The galvanic cell of claim 15, wherein the anodic electrolyte comprises a non-aqueous media housed in an anaerobic anode compartment, and the non-aqueous media comprises a mixture of quinone species.

* * * * *